T. P. PEDERSEN.
PERAMBULATOR.
APPLICATION FILED APR. 17, 1915.
1,149,983.
Patented Aug. 10, 1915.
2 SHEETS—SHEET 1.
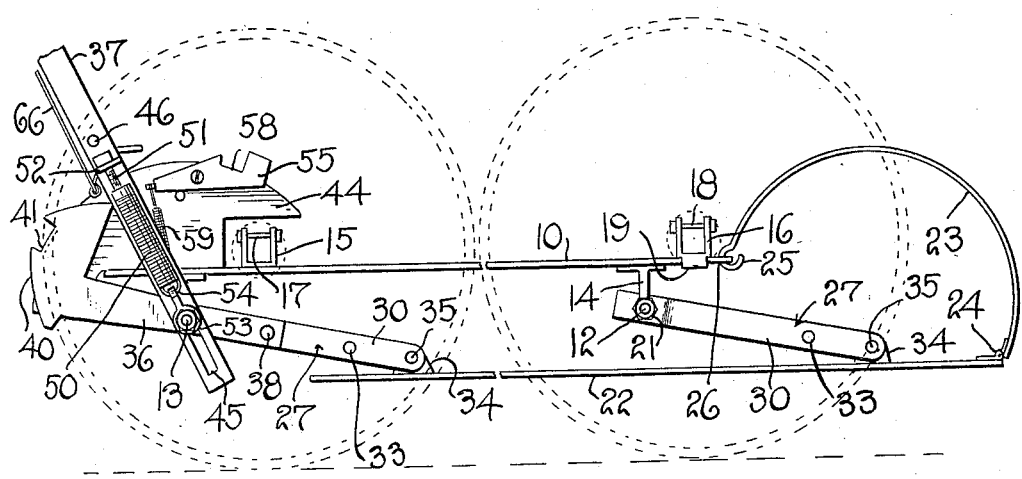
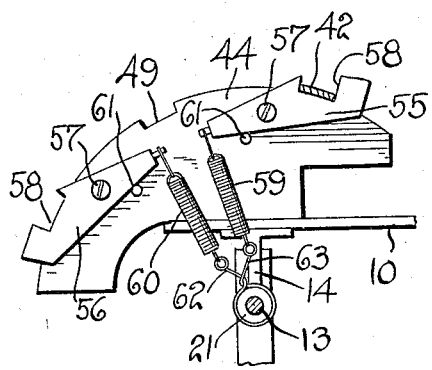
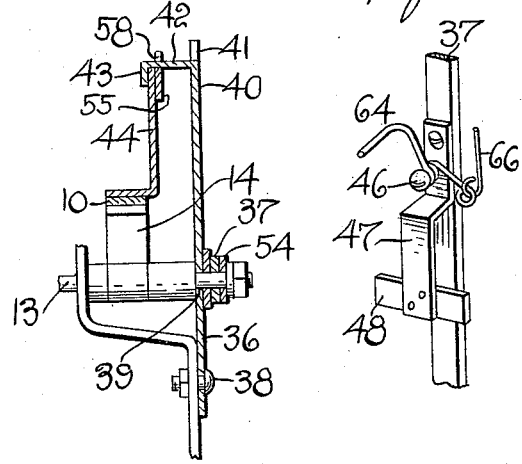
Inventor
T. P. PEDERSEN
By Watson E. Coleman
Attorney

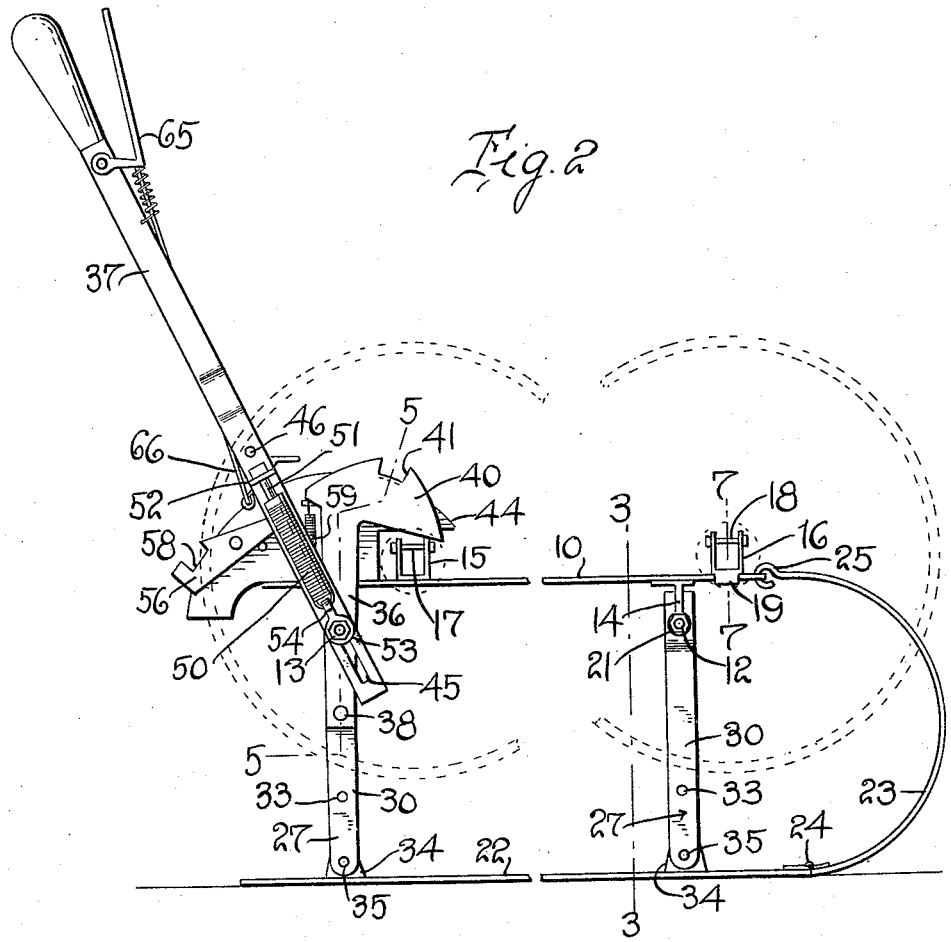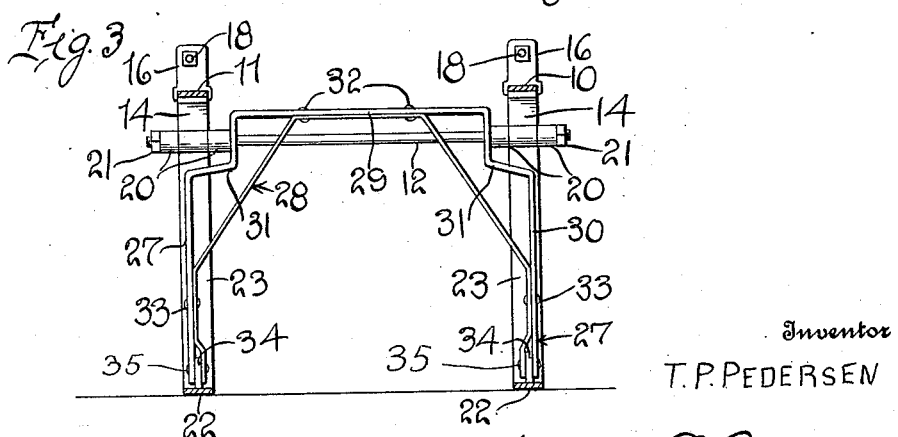

UNITED STATES PATENT OFFICE.

THOMAS P. PEDERSEN, OF HORNELL, NEW YORK, ASSIGNOR OF ONE-HALF TO CHARLES F. BORNT, OF HORNELL, NEW YORK.

PERAMBULATOR.

1,149,983.  Specification of Letters Patent.  Patented Aug. 10, 1915.

Application filed April 17, 1915. Serial No. 22,113.

*To all whom it may concern:*

Be it known that I, THOMAS P. PEDERSEN, a citizen of the United States, residing at Hornell, in the county of Steuben and State of New York, have invented certain new and useful Improvements in Perambulators, of which the following is a specification, reference being had to the accompanying drawings.

The present invention relates broadly to new and useful improvements in vehicles of the type known as perambulators but has reference more particularly to an improved sled attachment for vehicles of this character.

One of the principal objects of this invention is to provide a simply constructed sled which may be quickly attached to any perambulator of standard design and is so constructed that its runners may be lifted into inactive position, permitting the vehicles to be supported upon its wheels, or may be projected below the treads of the wheels to engage the ground and thus support the vehicle.

Another and more specific object of the invention is to provide a sled attachment which consists broadly in a supporting frame, attachable to a vehicle body, a pair of swingingly mounted legs which are carried by the frame, a pair of sled runners which are pivotally carried by the legs and a controlling lever which may be easily manipulated to elevate the runners into inactive position above the treads of the wheels or to project them below these members into engagement with the ground.

A further object is to provide as a means for adjusting the legs of the runner, a controlling lever which is fixed with respect to the legs and a handle which may be engaged with the lever for swinging this member and with it the supporting legs, or may be disengaged from the lever and maintained in an out-of-the-way position after the runners have been adjusted.

Another object of the invention is to provide a device of the above character which is designed with such regard to proportion, number and arrangement of parts that it may be cheaply manufactured, will be durable and efficient in service and may be readily applied to or removed from any perambulator of standard lines.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a side elevation of a sled attachment showing the runners in elevated, inactive position; Fig. 2 is a side elevation showing the runners in active position; Fig. 3 is a section on the line 3—3, of Fig. 2; Fig. 4 is a detail view in side elevation of the sector plate and locking dogs employed in holding the controlling lever of the runners in adjusted position; Fig. 5 is a section on the line 5—5 of Fig. 2; Fig. 6 is a detail perspective view of the latch and dog releasing member carried by the handle; and Fig. 7 is a section on the line 7—7 of Fig. 2.

In its preferred embodiment the present invention includes as its essential elements of construction, an attaching frame, a pair of runners which are suspended therefrom by means of pivoted legs and a controlling means whereby the runners may be elevated into inactive position or projected into operative engagement with the ground.

The supporting frame includes a pair of parallel bars or beams 10 and 11, and a pair of shafts 12 and 13 which are connected thereto by brackets 14 and serve to hold the members in the desired fixed relation to each other. The bars 10 and 11 are adapted to be secured to the shafts of the perambulator and are for this purpose, therefore, each equipped with attaching clips indicated at 15 and 16. The clips 15, which are secured to the rear ends of the bars, are substantially U-shaped and are apertured at their upper terminals to receive bolts 17, whereby they are secured to the rear axle of the perambulator. The clips 16 are also substantially U-shaped and are apertured at their upper terminals to receive bolts 18 whereby they may be secured to the front axle of the vehicle. It is desirable that the clips 16 be movable longitudinally on the bars so that these members may be readily attached to vehicles having wheel bases of different lengths. For this reason the clips 16 are provided with sleeves 19 which are freely slidable on the bars at the forward ends thereof and permit the clips to be longitudinally adjusted.

At each terminal of each shaft 12 and 13, there is provided a pair of longitudinally spaced collars 20 and a nut 21, by means of which the shafts are held against longitudinal movement through the brackets 14.

The runners which are carried by the pivoted legs are similar in construction, each consisting of a flat straight body bar 22 and a substantially semi-circular bow piece 23. A hinge 24 is employed in pivotally connecting each bow piece to its body bar. The upper terminals of the bow pieces are provided with hooks 25 which are insertible in receiving slots 26 formed in the forward ends of the bars 10 and 11 and serve to freely connect the bow pieces thereto. At this point it is desired to direct attention to the fact that the hooks limit the forward movement of the sleeves 19.

The legs, by means of which the body bars of the runners are adjustably suspended from the attaching frame above described, are also similar in construction, each consisting of a substantially U-shaped body frame 27 and a bracing frame 28. The frame 27 is bent at the junction of the bight and arm portion 29 and 30 respectively to form the elbows 31, through the vertical portions of which pass the shafts 12 and 13. The bracing frame of each leg is connected at its upper terminal to the bight portion of the members 27, by rivets or equivalent devices 32, while its lower ends are engaged against the inner faces of the members 30 and secured thereto by rivets 33. The extreme lower terminal of each member 28 is laterally offset so that the attaching ears 34 rising from the members 22 may be received between the members 30 and the bracing frame. Pivot bolts indicated at 35 are employed in attaching the ears, as shown in Fig. 1.

From the foregoing description it will now be readily observed that the runners may be quickly attached to the vehicle by securing the bars 10 and 11 to the axles thereof and that they may be elevated into inactive position, as in Fig. 1, by swinging the legs upwardly or projected into operative position, as in Fig. 1 by swinging the legs downwardly.

As a means for accomplishing this adjustment of the runners, I employ a controlling lever 36 and a handle 37. The controlling lever 36 is secured at its lower terminal to the rear leg as by a bolt 38 and is provided intermediate its length with an aperture 39 which freely receives the rear shaft 13, so that the lever is in effect, rotatably mounted on the shaft. The upper terminal of the controlling lever is provided with a sector plate 40 in the curved edge of which is formed a latch receiving notch 41. From the inner edge of this notch there extends a lateral latch tongue 42, the free end of which is bent at right angles, as at 43 and is disposed to engage against the inner face of a sector plate 44, for holding the sector plate 40 against movement away from the same.

The operating handle 37 consists of a metal bar, the lower terminal of which is provided with an elongated longitudinally extending slot 45, which receives the rear shaft 13 and permits the handle to be moved transversely with respect thereto. Secured to the inner face of the handle at an intermediate point thereon, by means of a bolt 46, is a latch tongue 47. This member 47 extends laterally from the handle and is bent downwardly and at right angles at its free end to bear against the inner face of the sector plate 44. A foot plate 48 is provided for the lower terminal of the latch 47. This foot plate serves to space the bent terminal of the latch from the inner face of the sector plate 44, thereby reducing the friction during the swinging of the handle to a minimum.

The handle is normally disposed at a rearward inclination of approximately 45° to the vertical so that it will laterally aline with the handles of the perambulator and thus lie in an out-of-the-way position. For this reason, the sector plate 44 is provided at its approximate central point with a latch receiving notch 49 in which the latch tongue 47 of the handle is yieldably held by means of the contractile helical spring 50. The upper terminal of this spring is connected as by a bolt 51, and bracket 52 to the handle and is secured at its lower terminal to the rear shaft 13 by a ring 53 having a hook 54. The spring normally tends to hold the handle down so as to seat this member in the inner end of the slot 45. The handle is adapted for use only as a means for swinging the controlling lever 36 during the adjustment of the runners and it is necessary therefore, to provide a pair of locking dogs 55 and 56 to hold the controlling lever in adjusted position when the runners are in either operative or inoperative position.

The two locking dogs 55 and 56 are similar in construction, each consisting of an arcuate metal plate which is pivoted intermediate its length as on a pivot bolt 57 to the sector plate 44. A latch receiving notch 58 is formed in the outer edge of each dog for the reception of the latch tongue 42 of the controlling lever. Springs 59 and 60 are connected to the inner ends of the locking dogs and to the axle or adjacent portions of the attaching frame for normally maintaining the dogs in operative position with their free ends projecting beyond the upper edge of the sector plate 44. Stop screws 61 or equivalent elements are secured to the sector plate 44 for limiting the swinging movement of the dogs. Preferably the springs 59 and 60 are attached to the shaft 13 by means of a single length of wire which is wrapped about the outer collar 21 thereon and is then twisted, producing the arms 62 and 63 which are provided with hooks to receive the lower terminals of the spring.

The actual construction and arrangement of the several parts of the controlling lever, operating handle and locking tongues being thus described, it now remains to explain the manner in which these elements are manipulated, when it is desired to adjust the runners. In this connection, reference will first be had to Fig. 1 in which the runners are shown in elevated position. When the runners are thus disposed, the latch tongue 42 of the controlling lever is disposed within the receiving notch of the dog 56 and the controlling lever is thus held against swinging movement. Since the controlling lever is connected to the rear legs in the manner previously described, it is obvious that these members are held in elevated position and that the runners are thus supported in inactive position above the tread of the perambulator wheels. When it is desired to swing the runners downwardly and rearwardly into operative engagement with the ground, it is necessary to first pull the handle upwardly against the tension of the spring 50 to withdraw the latch tongue 47 from the receiving notch of the sector plate 44, in order that the handle may be swung to dispose its latch tongue above the latch tongue 42 and receiving notch 41 of the sector plate 40. When the handle has been thus disposed, it may be released, whereupon the spring 50 will pull it downwardly, seating the latch tongue 47 upon the latch tongue 42 and in the notch 41.

It now becomes obvious that it is necessary to provide some means for depressing the dog 56 in order that the upper edge of this member will be disposed flush with the upper edge of the sector plate 44, so that the latch tongues 42 and 47 will be free to move over the plate 44. In this connection, I employ a releasing pawl 64, which is pivoted upon the bolt 46 and is connected to a pivoted handle lever 65, by means of a rod 66. By swinging the member 55, it is obvious that the operator may swing the releasing pawl to cause this member to engage with the dog 56, swinging the same against the tension of the spring 60. Thus the dog 56 may be withdrawn from engagement with the latch members 42 and 47 and the handle 37 may be swung upwardly, carrying with it the controlling lever 36. As the handle moves to vertical position, the latch member 42 engages the projecting upper edge of the dog 55, depressing this member against the tension of the springs 59, until the latch members 42 and 47 are disposed above the notch 58, at which time the springs 59 will swing the dog to locking position, wherein the members 42 and 47 are received within the notch 57. Thus the controlling lever is locked in vertical position by the dog 55 and the supporting legs of the runners are consequently secured in vertical position with the runners are projected into operative engagement with the ground. It then remains to again pull the handle 37 upwardly against the tension of the spring 50, until the latch tongue 47 is disengaged from the notch 41 of the sector plate 40 and to swing the handle rearwardly until the latch tongue 47 again seats in the notch 49 of the sector plate.

The manner in which the handle and associated parts are manipulated to return the runners to inoperative, elevated position, is, of course, similar to the manner in which they are operated to lower the runners into operative position and need not, therefore, be set forth in detail.

It is desirable to now direct particular attention to the fact that in the present invention, the sled runners are swung forwardly when being moved from operative to inoperative position. This feature is one which is productive of a considerable and material practical advantage, for since the runners are disposed as far forward of the perambulator, as possible there will be little liability of contact of the runners with steps or the like when the perambulator is being taken up and down stairs or curb-stones. It is also desirable to particularly emphasize the fact that the handle 37 may be disposed in an out-of-the-way position when the controlling lever 36 has been set to maintain the runners in an adjusted position.

In reduction to practice, it has been found that the form of this invention illustrated in the drawings, and referred to in the above description, as the preferred embodiment, is the most efficient and practical, yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:

1. A sled attachment for vehicles including an attaching frame adapted to be secured to the axles of the vehicle, a pair of legs swingingly connected thereto, a pair of runners pivoted to the free ends of the legs, a controlling lever connected to one of the legs for swinging the legs into position wherein the runners are active or inactive, at will, a sector plate, and a pair of locking dogs carried thereby and engageable with the controlling lever for locking the same in adjusted position.

2. A sled attachment for vehicles including an attaching frame adapted to be secured to the vehicle, a pair of legs swingingly connected to the frame, a pair of runners pivotally connected to the free ends of the legs, bow pieces for the runners hingedly connected to the forward ends of the runners and to the frame, and a controlling lever for elevating or depressing the runners.

3. A sled attachment for vehicles including an attaching frame consisting of a pair of longitudinal bars, and a pair of transverse shafts connecting the same, of pairs of legs swingingly suspended from the shafts, runners pivotally secured to the lower terminals of the legs, bow pieces one end of each bow piece being pivoted to the forward end of a runner and the other end of the bow piece being pivoted to the forward end of a longitudinal bar, and a controlling lever for elevating or depressing the legs.

4. A sled attachment for vehicles including an attaching frame, a pair of legs suspended therein, a pair of runners carried by the legs, a controlling lever fixed to one of the legs, a sector plate secured to the frame, pivotally mounted dogs carried by the sector plate and engageable with the controlling lever for holding the runners in either elevated or depressed position, and means for releasing the dogs from engagement with the controlling lever, whereby the same may be moved to swing the runners to adjusted position.

5. A sled attachment for vehicles including an attaching frame, runners swingingly connected thereto, a fixed sector plate, a controlling lever operatively connected to the runners and movable for elevating or depressing the runners, pivoted locking dogs secured to the sector plate and engageable with the controlling lever for holding the same in adjusted position, and a handle engageable with the controlling lever for adjusting the same.

6. A sled attachment for vehicles including an attaching frame, runners swingingly connected thereto, a fixed sector plate, a controlling lever operatively connected to the runners and movable for elevating or depressing the runners, pivoted locking dogs secured to the sector plate and engageable with the controlling lever for holding the same in adjusted position, a handle engageable with the controlling lever for adjusting the same, and means carried by the handle and engageable with the locking dogs for moving the same to inoperative position, whereby the controlling lever may be swung to elevate or depress the runners.

7. A sled attachment for vehicles including an attaching frame, runners swingingly connected thereto, a fixed sector plate, a pair of locking dogs pivoted thereon, yieldable means normally holding the dogs in operative position, a controlling lever connected to the runners, a latch carried by the controlling lever, said dogs being engageable with the latch for holding the controlling lever in adjusted position, a handle independent of the controlling lever, said handle being adapted to be connected to the lever for swinging the same during the adjustment of the runners, and means carried by the handle for rendering the locking dogs inoperative, when the controlling lever is to be swung.

8. A sled attachment for vehicles including an attaching frame, runners swingingly connected thereto, a controlling lever connected to the runners, means for holding the lever in adjusted position, and a handle normally disposed in inoperative relation to the lever, but movable to engagement with the lever for swinging the same during the adjustment of the runners.

In testimony whereof I hereunto affix my signature in the presence of two witnesses.

THOMAS P. PEDERSEN.

Witnesses:
JOHN F. LEO,
EDWARD J. SCHWAGER.

Copies of this patent may be obtained for five cents each, by addressing the "Commissioner of Patents, Washington, D. C."